Oct. 13, 1959 — F. B. PFEIFFER — 2,908,313
PNEUMATIC TIRE VALVE
Filed Jan. 23, 1958 — 2 Sheets-Sheet 1

*INVENTOR.*
FRED B. PFEIFFER

Oct. 13, 1959     F. B. PFEIFFER     2,908,313
PNEUMATIC TIRE VALVE

Filed Jan. 23, 1958     2 Sheets-Sheet 2

INVENTOR.
FRED B. PFEIFFER

United States Patent Office 2,908,313
Patented Oct. 13, 1959

2,908,313
PNEUMATIC TIRE VALVE
Fred B. Pfeiffer, Akron, Ohio
Application January 23, 1958, Serial No. 710,714
3 Claims. (Cl. 152—429)

This invention relates to tire valves for the walls of pneumatic tires.

Early in the history of pneumatic tires rubber valves were disposed in the wall of a tire to control the passage of inflationary air to and from the tire. Examples of such tire wall valves are illustrated in Pickett Patent No. 612,570 and Tubbs Patents Nos. 2,318,115 and 2,634,785. Whether or not the early valves, disposed in the sidewall wall of a tire, were commercially successful applicant does not know, but it is known that such valves were not used commercially, for tire sidewall valves, for modern pneumatic automobile tires, before the recent advent, of automobile manufacturers furnishing tubeless tires as standard original equipment.

At least one large manufacturer of automobile tires has announced the adoption of an all rubber valve disposed in the sidewalls of their tires and it is generally recognized, by tire engineers and automobile stylists, that there are many advantages of an all-rubber valve in the sidewall of a tire as compared to the present conventional tire valves which project through valve holes in tire rims. Two advantages of the so called all-rubber sidewall-valve are a substantial saving in cost and greater latitude for the design of the automobile and particularly for brake drum clearance when the tire bead diameters are small as, for example, 14″ or 13″ diameters. The side-wall valve also avoids holes in ormanental hub-caps and valve stems projecting from said holes which holes and projecting stems automobile stylists consider detracts from the beauty of a streamlined automobile.

Upon the tire industry's return to use of sidewall valves, a serious problem developed, namely, the tire inflationary air that comes into contact with the sides of the hole through the wall of a tire; either due to the valve being intentionally designed for such air contact, or due to the air leaking by the valve seat and contacting the sides of the hole in the wall of the tire and, in either case, the air remaining in such contact under pressure; passes into the body of the tire through the tire cord fabric that constitutes the tire strain members of the tire body plies. As is well known in the art the presence of air in the body of a tire results in premature tire failure.

It is an object of the present invention to provide a sidewall valve for a tubeless pneumatic tire which valve has a valve seat as efficient, or more so, in sealing tire inflationary air within a tire as are the valve seats of presently known tire sidewall valves and, to provide such valve with means to prevent the passage of the tire inflationary air into the body of a tire, at the sides of the hole through the wall of the tire, in which the valve is disposed.

Another object of the invention is to provide means for forming a hole through the wall of a tire to accommodate a said sidewall valve which means reducing to a minimum the displacement of the tire cords at the sides of the hole.

A further object of the invention is to provide a protective rim about the outer entrance of the hole in the tire wall so designed as to promote self cleaning of the hole and provide protection to valve elements disposed in said hole.

A still further object of the invention is to provide a tire sidewall valve that can be easily inserted in a hole in the wall of a tire without disturbing the surface of the sides of the hole.

Yet another object of the invention is to provide such construction at the sealing area of the valve at the inner entrance of the hole through the tire wall as will protect the valve stem from the severe flexing action of the sidewall of the tire when a tire is running in service.

Another object of the present invention is to provide a valve that is self adjusting in length to accommodate it to tire walls that vary in thickness due to manufacturing tolerances of thickness of material used in fabricating a tire.

Another object of the invention is to provide a rubber tire sidewall valve that does not create an area of localized flexing in a tire adjacent the valve.

Other objects and advantages of the present invention will be apparent to those familiar with the art, from the following description, in connection with the accompanying drawings, of a preferred embodiment of the invention.

Figure 2:
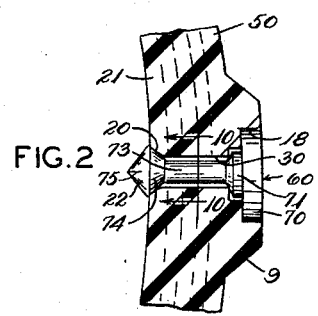
Figure 2 is an enlarged fragmentary view of Figure 1 taken at the valve portion and showing more clearly the operative relative shapes of the tire and valve.
Figure 3:
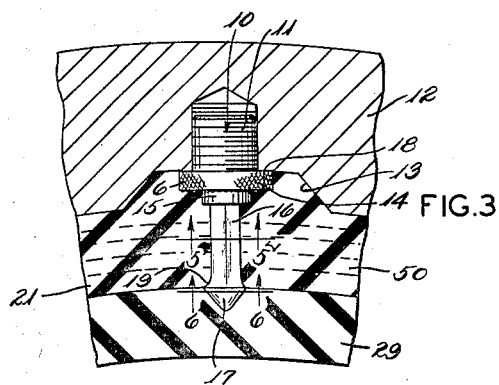
Figure 3 is an enlarged fragmentary sectional view of a tire mold, a tire wall piercing pin, a tire and a tire curing bag, shown as they appear after a tire has been molded and vulcanized but before the internal pressure has been removed from the curing bag.
Figure 5:
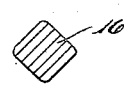
Figure 6:
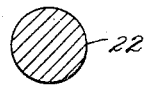
Figure 7:
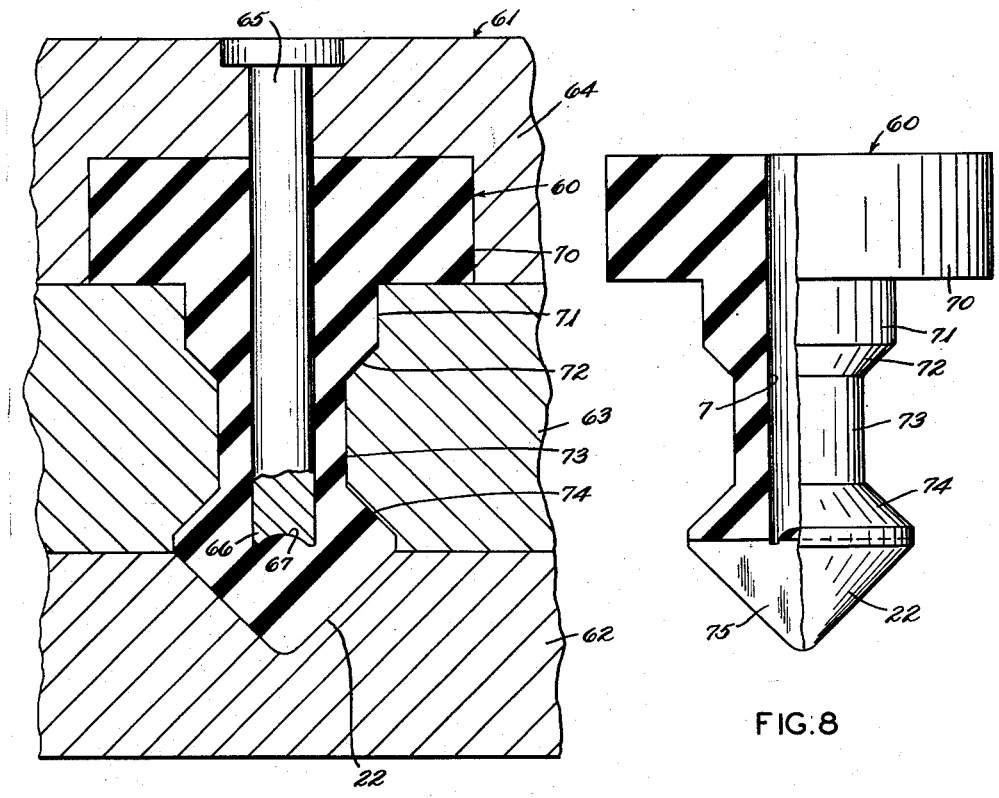
Figure 8:
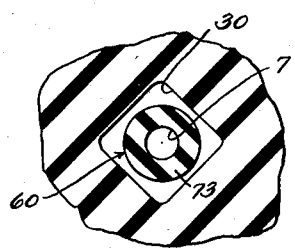
Figures 9, 10:
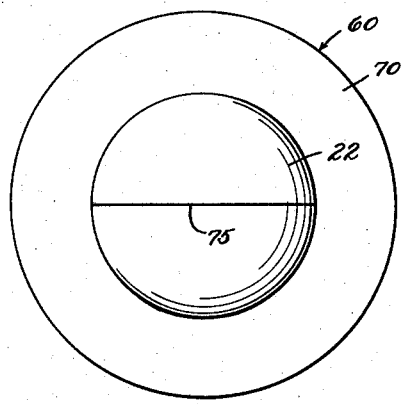

Figures 5 and 6 are sectional views of the pin taken on line 5—5 and 6—6 of Figure 3 respectively;

Figure 7 is an enlarged sectional view of a valve mold showing a valve embodying the present invention molded therein;

Figure 8 is a side elevation of the molded valve of Figure 7;

Figure 9 is an end view of the small end of the valve illustrated in Figure 8 and showing a cut slit to complete an axial air passage through the valve, and Figure 10 is a sectional view taken on line 10—10 of Figure 2.

Figure 1:
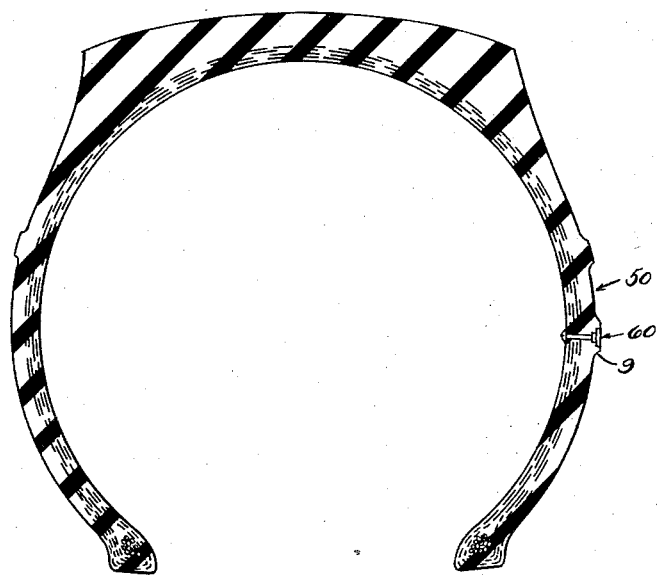
Figure 1 is a sectional view illustrating the combination of tire and valve embodying the present invention.

Referring to the drawings in more detail and to Figures 3, 4, 5, and 6 in particular the forming of the valve hole through the sidewall of the tire will now be described:

A piercing pin referred to generically as 10 (see Figure 3) has an end 11 in threaded relation with a side of a tire mold 12 and at approximately 50% of the radial distance from the mold's tire bead forming portion to its tire tread forming portion, the latter two portions not being shown but their relative positions will be understood by those familiar with tire molds and by reference to the molded tire shown in Figure 1. Pin 10 projects into the mold 12 from a recess 13 for molding a relief embossed portion 9 on a tire for a purpose to be explained hereinafter. An annular flange 14 contacts the bottom of recess 13. An annular shoulder 15 of smaller diameter than flange 14 joins flange 14 axially thereof. From shoulder 15 the pin has a neck portion 16 that extends to a pin head portion 17 as will be seen by reference to Figure 3. Flange 14 molds a recess 18 in the sidewall rubber of a tire 50 (see Figure 2) and the surface of flange 14, that contacts the sidewall rubber, has a knurled portion 6, or otherwise grooved so as to mold an air escape channel or channels between the valve shown in Figure 8 and the surface of the recess flange 14 molds. As will be explained later the diameter of flange 14 corresponds to the diameter of the outer end of a valve of Figure 8 to be disposed in the valve hole formed by pin 10. Shoulder 15, of pin 10, molds a pilot hole to facilitate insertion of a valve stem as will also be explained later herein. Neck 16 is preferably multi-sided and terminates at its inner or small end in an annular head 17 which has a flared conical surface 19 to mold a conical valve seat 20 in the tire lining 21 as will be seen by reference to Figure 2. The extreme inner or piercing end 22 of pin 10 is conical with a slightly rounded apex to avoid piercing a cord of the tire fabric.

In operation a tire sidewall hole, referred to generically as 30 and best shown in Figure 2, is formed through the sidewall of an otherwise usual tubeless tire by placing such tire, referred to here as 50, in mold 12 and molding and vulcanizing the tire in the usual manner employing the usual curing bag or functionally similar fluid container 29. It is to be understood that the invention is not to be limited to tires molded and vulcanized employing curing bags or a functionally similar fluid container as the invention is equally useful regardless of the mechanics of molding the tire and the valve hole therein. As the internal tire molding pressure builds up in curing bag 29 of the wall of tire 50 is gradually forced against pin 10 and the walls of tire mold 12. Conical head 17 of pin 10 pushes the cords of the tire fabric aside as the cords are forced past the head of the pin by the curing bag. Distortion of the cords of the tire fabric from their normal direction of extent in a finished tire is undesirable and it is important that such distortion be reduced to a minimum wherever a pin is used to mold a tire sidewall. Obviously, the rigid pin must replace a volume of tire material equal to the size of the hole molded in the valve. In the prior art no provision was made to accommodate the replaced material and the distortion of the cords of the tire fabric was extreme. The present invention provides an embossed portion 9 into which the outer layer of rubber of the wall of the tire about the valve hole being molded flows during the molding of the tire. Applicant discovered that without emboss 9 the pin would turn the tire ply fabric axially inward at the inner edge of the valve hole which resulted in the inner liner 21 being forced away from the inner edge of the valve hole and exposing the said fabric to the tire inflationary air. However, emboss 9 corrected such misplacement of the tire ply fabric and molded the fabric plies in their original planes and undisturbed except to be pushed aside sufficiently to permit the pin 10 to enter the wall of the tire. The exact movement of the tire body material about pin 10 during the molding of the valve hole has not been definitely determined, but it is applicant't theory that since the rubber flows readily and fabric does not that as the pin is forced into the tire wall it tends to force the fabric ahead of the pin while the internal pressure of the tire tends to bulge the entire thickness of the wall into recess 13 at which time the rubber of the outer layer, or so called tire sidewall rubber, and some of the rubber coating of the tire plies flows into and fills said recess but at the beginning of such flow the entire thickness of the tire wall is arched slightly toward the recess. Such arching results in a concavity in the inside or lining side of the wall axially inwardly of the pin into which cavity the tire lining rubber is arched so that when the end of pin 10 emerges into and through the lining a slight accumulation of lining rubber has flowed into the concavity and holds the fabric at the edges of the valve hole back and covers same with sufficient rubber to prevent the fabric from protruding through the lining. As the arched surface contacts the bottom of recess 13 an amount of sidewall rubber has accumulated ahead of the fabric plies so that the plies are returned to their original planes. Whatever the proper explanation may be, it will be seen that the embossed feature obviates the use of an excessively thick layer of rubber on the outside of the tire which otherwise would be required to provide the necessary thickness of rubber to mold the outer end of the valve hole without shoulder 15 contacting and displacing the said cords of the tire fabric. If desired the raised lettering, or other insignia usually appearing on the walls of tires, may be utilized to form all or a part of embossed portion 9. It is desirable that the emboss be tapered as shown (Figure 2) to avoid curb and similar damage.

Figure 4:
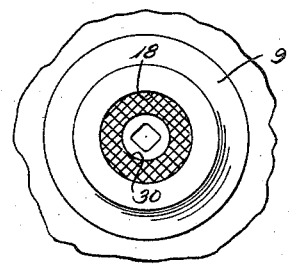
Figure 4 is a plan taken outside the tire of the hole formed by the pin shown in Figure 3.

The cords of the plies of cord tire fabric usually are arranged so that the cords of adjacent plies cross at an angle of approximately 90°. The neck of pin 10 is substantially square with rounded corners as shown in Figure 4 to accommodate the angularity of the cords just described. Pin 10 is so disposed as to have its flat sides parallel to cords in the tire plies which reduces the misplacement of the cords substantially to that which would result if a pin of different cross section were used. It is to be noted that the sectional sides of the valve hole through fabric plies of the tire wall by pin 10 are straight except at corners and that the sides parallel the original directions of the ply cords before the latter were displaced by pin 10. This sectional shape of the valve hole through the tire cord fabric is another important feature of the present invention as will now be explained.

Cord tires made of textile cords expand or grow after they have been placed in service. While the growth is not great it is sufficient to cause a change of angle between the tire cords of the tire. This results in a change of the sectional shape of the molded valve hole by elongating the hole radially of the tire wall. Thus a round valve hole becomes elliptical in service as the growth of the tire functions to pull the cords straight. Applicant's straight sides disposed as explained reduces the change of direction of extent of the cords, molded about a pin or rigid object used to form a tire wall valve hole, to a minimum and tends to prevent separation of rubber from the cords at the area of change adjacent the valve hole. As is well known, separation between rubber and tire fabric once started in a tire develops rapidly in tire service and results in premature failure of the tire.

Referring again to Figure 3 it will be noted, as stated hereinabove, that end 22 of pin 10 is adapted to mold a conical valve seat 20 in an inner lining 21 of tire 50. While applicant has illustrated his invention relative to the use of pin 10 projecting from the tire mold it is to be understood that the invention is not to be limited to this specific manner of forming the valve hole. With the recent advent of substantially air impervious rubber-like materials such as butyl vulcanizing tires with the fluid pressure medium in direct contact with the lining of the tire is now considered practical and the present invention contemplates such method of molding and vulcanizing tires whereby curing bag or other fluid container 29 would not be necessary.

A valve referred to generically as 60 and embodying the present invention is illustrated in Figures 8 and 9 and its method of molding illustrated in Figure 7. Referring first to Figure 7 the valve 60 is shown in a well known type of three-piece mold 61 comprising the usual plates bottom 62, middle 63, and top 64. Plate 64 is provided with a pin 65 which functions to mold an axially and centrally disposed passage 7 (see Figure 10) from the outer end of valve 60 to and near the valve's inner end. Pin 65 is round in cross-section and terminates at its free end in a concave recess 66 whereby the bottom of the passage pin 65 molds has a convex bottom 67 to cooperate with a valve inserting tool as will later be explained. The necessary unvulcanized rubber to form valve 60 is prepared in the usual manner as by extrusion and cutting into blanks. Since mold 61 and the molding of valve 60 does not represent any novel features and is not claimed in this application a detailed disclosure of same is considered unnecessary to a complete disclosure of the present invention.

Valve 60 comprises an annular flange 70 whose thickness and diameter is substantially the same as the depth and diameter respectively of recess 18 molded in the sidewall rubber of the tire. As will be seen by reference to Figure 2 flange 70 fits into recess 18 with its exposed surface flush with the surface of embossed portion 9. If found desirable the thickness of flange 70 may be less than the depth of recess 18 and the outer edge of the flange may be rounded. Applicant prefers said knurled or grooved portion be on the surface of recess 18 but if found desirable it may be omitted from recess 18 and placed on flange 70, or such knurling or grooving may be disposed on the surfaces of both recess 18 and flange 70. The knurling, grooving or similar treatment 6 of recess 18 or flange 70 may take any of various forms adapted to facilitate the escape of air from hole 30 while combating the entrance of foreign material thereinto. It will be obvious to those skilled in the art that flange 70 may be shaped to cooperate with the side of recess 18 to form a one-way type valve, namely to permit air, under slight pressure, to escape from hole 30 while preventing entrance of water or dirt from entering the hole to further protect the valve seat 20 from contamination. Valve 60 has an annular shoulder 71 of smaller diameter than flange 70 and axially aligned therewith which shoulder is of less diameter and thinness than shoulder 15 or pin 10 so that air may pass freely between shoulder 15 and the side and bottom of the recess molded by shoulder 15 in the sidewall rubber of tire 50. It is to be understood that shoulder 71 of valve 60 may be treated in respect to said knurling and grooving as explained in reference to flange 70 of valve 60. At any rate, the invention contemplates forming hole 30 and valve 60 of relative shapes that will permit the escape from hole 30 of any tire inflationary air that may leak past valve seat 20 when a tire 50 is in service. A bevelled surface 72 joins shoulder 71 to a neck portion 73. Neck 73 is smaller in sectional area than the smallest sectional area of hole 30 in which it is disposed in service and merges at its inner end into a radially outwardly extending conical portion 74 adapted to seat on conical valve seat 20 as will be seen by reference to Figure 2. The inner end of the valve terminates in a conical or dome shaped portion 22 that projects inwardly beyond lining 21 of tire 50 when tire and valve are cooperating in service. The centrally disposed axially extending hole 7 opens axially outwardly on the axially outer surface of valve 60 and extends to or just beyond the axially inner portion of conical portion 74. After valve 60 has been molded, as explained hereinabove, a slit 75 is cut into and across end 22 to a depth to bring said slit in communication with hole 7, thus completing an air passageway axially through the body of valve 60.

The installing of valve 60 into valve hole 30 and the manner it operates will now be explained:

A valve inserting tool in the form of a pin substantially in the shape of, but somewhat smaller in section, but longer than pin 65 of the valve mold is provided and preparatory to inserting the valve in hole 30 said valve inserting tool is inserted in hole 7 of the valve, with the concave end of the tool entering first so as to come into contact with the bottom of the molded portion of hole 7. Since the entering end of said tool is concave and the molded bottom of hole 7 is convex and these are substantially complementary the end of the tool will not readily enter the slit 75 and may be pressed forcibly against said bottom of hole 7 whereby the inner end of the valve is forced inwardly of hole 30 until flange 70 and shoulder 71 contact the tire as illustrated in Figure 2. This method of inserting a rubber valve is not new and is substantially the same as disclosed in said Tubbs patents to which reference is made for further disclosure of said inserting tool and its use. The overall axial length of valve 60 to axially inner portion 74 of the valve is less than the axial length of hole 30 so that when the valve is inserted its inner end may be pushed by said tool beyond the inner surface of the tire, stretching said neck, with flange 70 resisting such required force after which the tool is withdrawn when the stretched portion of the valve will draw conical portion 74 firmly against valve seat 20 when the valve and tire will be in operative relation for service. It is important to note that the thickness of the walls of tires in any given size and style vary and no two holes 30 will have the same axial length. The design of applicant's valve takes advantage of the elasticity of rubber in a manner that his valve functions properly over the range of tire wall thickness variations.

The inflation and deflation of a tire employing the present invention is done by means of a suitable hollow pin that is inserted into hole 7 for those purposes and removed after the desired amount of air is lead into or removed from the tire. This operation is disclosed in said Tubbs Patent No. 2,318,115 to which reference is made for details of inflating and deflating tires embodying the present invention.

It is desirable that hole 30 through the fabric portion of the wall of the tire be as small as proper operation of the invention permits and for that purpose the sectional area of hole 30 may be reduced relative to the sectional area of the neck portion 73 of valve 60 and said neck may have a knurled or grooved surface that communicates with the air passageway between valve shoulder 71 and flange 70 and the side of hole 30.

The present invention also contemplates additional protection of the cords of the tire fabric from contact with the leaking air by molding or otherwise covering the side of hole 30 with a layer of rubber or other insulating material which in combination with valve 60 would further combat the air entering the walls of the tire through the fabric at the side of hole 30.

The valve of the present invention is useful with tires in which the strain members or cords are wire or with tires in which the said cords will not permit air to flow therethrough, such for example, where the cords are each composed of a single monofilament of nylon or other material. In the latter case the problem of air entering the tire body does not exist but novel and useful features of the invention insures an improved seat 20 and compensates for variations in tire wall thickness between tires of the same kind and size.

In this application "rubber" is used to include elastomers and all rubbery materials that have characteristics similar to rubber and may be found satisfactory for tires and a valve constructed as disclosed by present specifications and drawings.

In service the stretched valve 60 draws its conical portion 74 against conical valve seat 20 which forms an air-tight seal between their contacting surfaces and at the same time exerts a compressive force on the conical or dome shaped end 22 of the valve which presses the sides of slit 75 together. It is noted that no rubber is removed when slit 75 is cut and under favorable conditions the slit would not permit air to enter hole 7; however, the walls of a tire running under load in service is subjected to pronounced distortion and the present invention provides additional slit closing force to prevent momentary opening of said slit when the tire is distorted. Additionally, the slit end of the valve is projected into the chamber of the tire where the effect of the flexing of the tire on said slit portion is lessened and the invention contemplates adding additional thickness of rubber at the inner end of hole 30 to remove said valve seat and slit further from the median line of the flexing sides of the tire if such modification of the construction illustrated is found desirable.

The present invention provides an improved rubber or rubber-like tire sidewall valve in respect to preventing air leaking by the valve seat and also prevents air that may have leaked by the valve seat into contact with the plies of a tire from entering the body of the tire. Since there is flexing of a tire at a sidewall valve it is certain that the valve and tire will deteriorate during service at that area and leaks at the valves into the hole through the tire will develop as a tire wears. Defective molding of valves or tires, foreign material on valve seat, etc., emphasizes the importance of the novel features the present invention employs to prevent inflationary air from entering the plies. If and when air should leak by valve seat 20 it is free to flow between valve neck 73 and the side of hole 30 to and past shoulder 71 and flange 70 to the atmosphere. It is to be understood that this passageway for escaping air is designed to be free of any reduction in sectional area that will permit a build-up of air pressure in hole 30 and it will now be seen and it is to be understood that the valve neck portion 73 in all its possible designs does not exert a compressive force against the side of hole 30. By avoiding such pressure as just mentioned the fabric body of the tire will be free to flex at the valve hole without the flex wave, to which a tire body is subject when running in service, being abruptly opposed by compressed material at the edge of hole 30. As is well known by tire engineers such localized areas of rigidity in a tire promotes tire failures at that area.

The detailed description of the particular embodiment of the present invention illustrated and described herein is not to be construed as limiting the invention thereto. The invention includes all features of patentable novelty residing in the foregoing description and the accompanying drawings.

I claim:

1. In combination a tubeless pneumatic tire having sidewalls and an all-rubber valve; said tire comprising a rubber lining, plies of cord tire fabric and a layer of rubber over the outer surface of the tire sidewalls; a valve hole through a said sidewall with a boss of rubber on the outer surface of the tire about the entrance of said hole; said valve hole from outside the tire axially inwardly comprising a first recess formed at least partially in said emboss of rubber, a second recess axially inwardly from the first recess and communicating therewith, a further extent of said valve hole of lesser cross-sectional area than that of said first or second recess, said further extent of the valve hole extending into said plies of cord, said valve hole terminating at its inner end in a flared conical valve seat axially inwardly of said plies; said valve being composed of rubber and having a shape generally complementary to the shape of said valve hole; said valve comprising an axially outer flange of size and shape to fit into said first recess of said valve hole, a pilot portion smaller in diameter and thickness than said second recesses of said valve hole, a neck portion extending axially from the pilot portion and being smaller in sectional area than said further extent of the valve hole, said neck portion terminating axially inwardly in an enlarged portion having an axially outwardly facing conical surface complementary to the surface of said valve seat and its axially inwardly facing surface being of dome-like shape; said valve having an air passageway in the form of a molded hole extending from the axially outer surface of said valve flange centrally through the valve into but not through said enlarged portion of the valve, an air-passageway in the form of a cut slit extending from the axially inner end of the said hole in said valve to and opening on the end surface of the valve; said valve being disposed in said valve hole with said valve flange disposed in said first hole recess and said conical surface of the enlarged inner end of the valve seated on said valve seat, the length of said valve from the axially inner surface of the valve flange to said conical surface being less than the length of the valve hole from the bottom of the said first valve hole recess to said valve seat whereby the elastic characteristics of the rubber of which the valve is composed draws the valve firmly against the valve seat; said combination axially outwardly of said valve seat having air passageway between the valve and side of the valve hole opening to the atmosphere through which tire inflationary air escaping past said valve seat may escape without developing air pressure within said valve hole.

2. The combination of a rubber tire sidewall valve and a pneumatic tubeless tire comprising, a valve hole through the wall of the tire and said valve installed in said hole, a valve seat formed on the inner surface of said tire at an end of the valve hole, said valve being seated on said valve seat, the sides of said valve hole and said valve being so formed relative to each other axially outwardly of said valve seat that an air passageway is provided extending from said valve seat and opening axially outwardly thereof, whereby inflationary air from said tire that leaks past said valve seat will escape to the atmosphere without building up air pressure in said valve hole.

3. The combination of a tire sidewall valve and a pneumatic tubeless tire comprising, a rubber valve having an elongated body with a centrally disposed axially extending air passageway therethrough, the surface of the inner axially extent of the passageway being in the form of a slit; a valve hole through the sidewall of the tire and said valve disposed therein; a valve seat formed on the inner surface of the tire at an end of the valve hole, said valve being seated on said valve seat; the confronting sides of the valve hole and the valve being so formed relative to each other axially outwardly of the valve seat as to provide an air passageway opening to the atmosphere axially outwardly of the valve.

References Cited in the file of this patent

UNITED STATES PATENTS

| | | |
|---|---|---|
| 670,725 | Pickett | Mar. 26, 1901 |
| 1,236,534 | Blodgett | Aug. 14, 1917 |
| 1,822,592 | Hutchinson | Sept. 8, 1931 |
| 2,230,879 | Bronson | Feb. 4, 1941 |
| 2,634,785 | Tubbs | Apr. 14, 1953 |
| 2,669,753 | Hormann | Feb. 23, 1954 |
| 2,754,887 | Wykoff | July 17, 1956 |
| 2,769,457 | Wittenberg | Nov. 6, 1956 |
| 2,769,476 | Herzegh et al. | Nov. 6, 1956 |